United States Patent Office 3,309,371
Patented Mar. 14, 1967

3,309,371
ORGANOPHOSPHOROTHIOATE COMPOUNDS
AND METHOD OF PREPARING SAME
Shirley DuBreuil Curry, Pennington, N.J., Richard W.
Young, Wellesley Hills, Mass., and Gerald Berkel-
hammer, Trenton, and David E. Ailman, Pennington,
N.J., assignors to American Cyanamid Company,
Stamford, Conn., a corporation of Maine
No Drawing. Filed Oct. 16, 1963, Ser. No. 316,541
16 Claims. (Cl. 260—925)

This application is a continuation-in-part application of copending U.S. application Serial No. 11,442, filed February 29, 1960, now abandoned.

The present invention relates to organophosphorothioate compounds and their preparation. More particularly the instant discovery concerns the preparation of organophosphorothioate compounds by bringing together thiophosphate esters of the formula (A)
$$\begin{array}{c}R_1A_1\phantom{xxx}S\\ \diagdown\phantom{x}\diagup\\ P\\ \diagup\phantom{x}\diagdown\\ R_3O\phantom{xxx}A_2R_2\end{array}$$

with an organophosphoric acid salt of the formula (B)
$$\begin{array}{c}R_4A_4\phantom{xxx}A_3\\ \diagdown\phantom{x}\diagup\\ P\\ \diagup\phantom{x}\diagdown\\ R_5A_5\phantom{xxx}SM\end{array}$$

to produce the corresponding salt of the formula (C)
$$\begin{array}{c}R_1A_1\phantom{xxx}SM\\ \diagdown\phantom{x}\diagup\\ P\\ \diagup\phantom{x}\diagdown\\ O\phantom{xxx}A_2R_2\end{array}$$

which, in turn, may be reacted with an organic halide or sulfate corresponding to the formula $(R)_nY$ to produce a product ester conforming to the formula (D)
$$\begin{array}{c}R_1A_1\phantom{xxx}SR\\ \diagdown\phantom{x}\diagup\\ P\\ \diagup\phantom{x}\diagdown\\ O\phantom{xxx}A_2R_2\end{array}$$

In the above formulae the symbols have the following significance:

$A_1$ through $A_5$ represent oxygen or sulfur;
$R_1$ represents lower alkyl or phenyl;
$R_2$ and $R_4$ represent lower alkyl, $$-CH_2\overset{O}{\overset{\|}{C}}NHCH_3,\ -\underset{\underset{CH_2COOC_2H_5}{|}}{C}HCOOC_2H_5,\ -CH_2SC_2H_5,\ -CH_2CH_2SC_2H_5$$

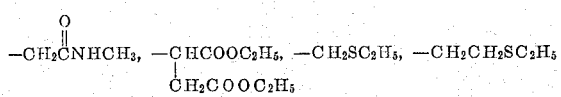, 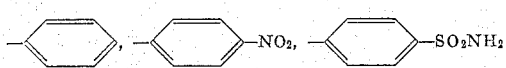

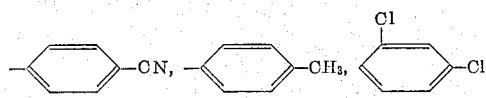

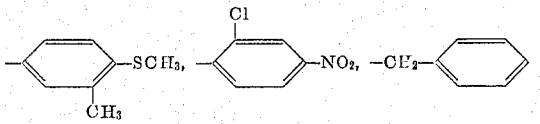

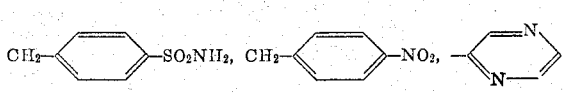

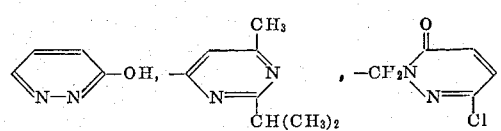

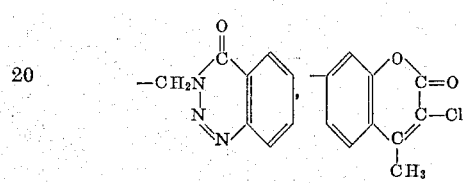

$R_3$ and $R_5$ represent lower alkyl;
M represents an alkali metal ion, including Na, K, Li, ammonium, and substituted ammonium, such as mono-, di- and tri-lower ($C_1$–$C_6$) alkyl ammonium, cyclohexylammonium, dicyclohexylammonium, and the like;
R represents lower alkyl $$-CH_2\overset{O}{\overset{\|}{C}}NHCH_3,\ -\underset{\underset{CH_2COOC_2H_5}{|}}{C}HCOOC_2H_5$$

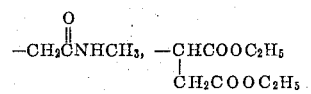

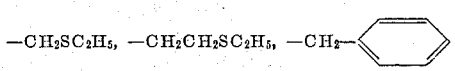

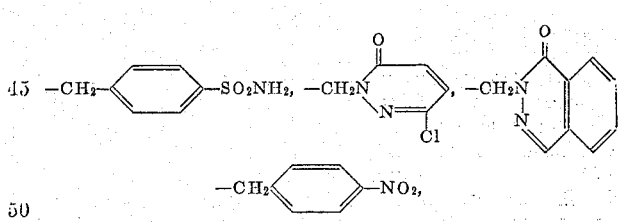

and the like.

Y represents halogen or sulfate; $n$ is the value 1 or 2.

A typical embodiment involves the reaction of O,O-dimethyl S-(N-methylcarbamoyl)methyl phosphorodithioate with potassium diisopropyl phosphorodithioate in methyl ethyl ketone to produce potassium O-methyl S-(N-methylcarbamoyl)methyl phosphorodithioate as follows:

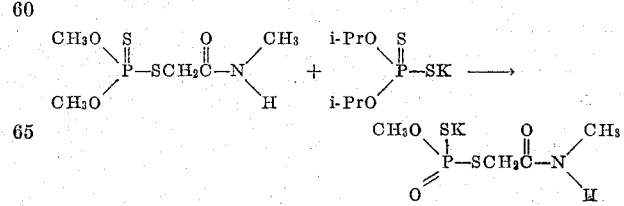

In turn, potassium O-methyl S-(N-methylcarbamoyl) methyl phosphorodithioate is reacted with dimethyl sulfate to produce the corresponding ester as follows:

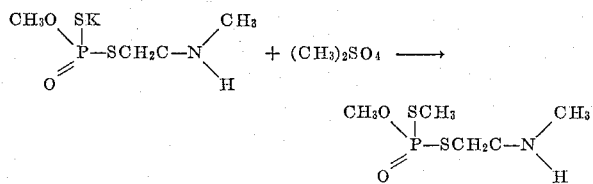

Quite unexpectedly, the present invention provides a novel, straightforward and unobvious process for producing new compounds and very desirable salts in good high yields, which salts are readily convertible to their corresponding esters. These esters manifest significant insecticidal and miticidal activity, as will be seen hereinafter.

Surprisingly enough, it has been discovered that when $R_4$ and $R_5$ of formula (B) above are both methyl, a rearrangement takes place in the fashion shown in the following typical example:

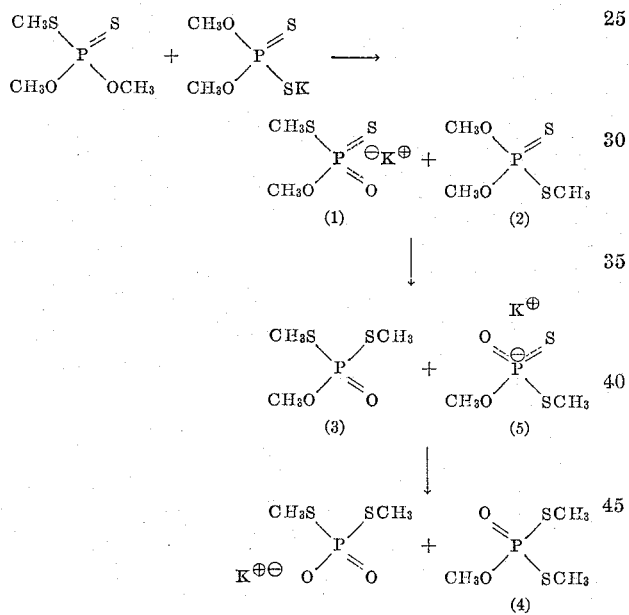

It appears that the reactant ester derivative (1) in the equation above undergoes a second reaction with the phosphoric acid salt derivative (2), and so on, until an equilibrium is reached and, in the instant case, product (4) conforming to formula (D), above, is produced. Equilibrium had not been reached in formula (3), above, because there was still a labile —$CH_3$ group attached to oxygen which was capable of reacting with sulfur in the

moiety of (5). If the alkyl group on oxygen were other than methyl, say it were propyl, then formula (5) would have been the product.

Obviously, in the anomalous reaction just shown it is not necessary to react the intermediate salt (1) or (5) with an $(R)_nY$ reactant, such as methyl sulfate, since the by-products (2) and (3) function much the same way.

Generally, the reactants are brought together in the presence of an inert solvent, i.e., a solvent which under the conditions of the reaction is inert with respect to the reactants and the reaction products. Typical solvents are water, organic solvents, such as methyl ethyl ketone, acetone, acetonitrile, carbon tetrachloride, methyl alcohol, ethyl alcohol, and ethoxyethanol, and other similar solvents.

It is an advantage of the present invention that the intermediate salts may be recovered after the first step (1) and subsequently reacted in a second step (2) with $(R)_nY$ compounds to produce their corresponding esters. As will be seen hereinafter, however, an in situ process (3) may be employed whereby the reactants (A), (B) and $(R)_nY$ of the generic equation, above, are brought together in a single-shot method and the corresponding ester (D) recovered, without the necessity of recovering (C). (For the meanings of (A), (B), (C), (D) and $(R)_nY$ see columns 1 and 2, above.)

The reactants may be brought together at room temperature (20° C.–25° C.) in any of these steps, i.e. (1), (2) or (3), but a wide range of temperatures is contemplated herein, from about 15° C. to about 100° C. As a practical matter, however, it is preferred to operate at the boiling point of the solvent employed.

While particularly desirable results are obtained at atmospheric pressure, it is significant to note that sub-atmospheric or super-atmospheric pressures may be employed without upsetting the nature of reactions (1), (2) or (3). Similarly, the reactants of the present invention may be brought together in any sequence and the process carried out in a continuous, semi-continuous or batch manner.

While equimolar proportions of the reactants are suitable and generally preferred, large or small excesses of any of the reactants contemplated herein may be employed without upsetting the nature of the reactions. As always, however, cumbersome excesses are impractical.

The present invention will best be understood by means of the following illustrative examples:

EXAMPLE I

*Dicyclohexylammonium O-methyl S-(N-methylcarbamoyl)methyl phosphorodithioate*

A solution of 4.58 grams (0.02 mole) of O,O-dimethyl-S-(N-methylcarbamoyl)methyl phosphorodithioate and 7.91 grams (0.02 mole) of dicyclohexylammonium O,O-diisopropyl phosphorodithioate (melting point 133° C.–135° C.) in 200 milliliters of carbon tetrachloride is allowed to stand at room temperature for two hours, then heated under reflux with stirring for 2½ hours and allowed to stand overnight at room temperature. Removal of the solvent under vacuum leaves a viscous oil which on trituration with hexane gives a solid. Two recrystallizations from carbon tetrachloride yield 3.2 grams (40 percent by weight of theory) of analytically pure product dicyclohexylammonium O-methyl S-(N-methylcarbamoyl)methyl phosphorodithioate, melting point 111° C.–114° C.

EXAMPLE II

*Potassium O-methyl S-(N-methylcarbamoyl)methyl phosphorodithioate*

A solution of 22.9 grams (0.1 mole) of O,O-dimethyl S-(N-methylcarbamoyl)methyl phosphorodithioate and 25.2 grams (0.1 mole) of potassium diisopropyl phosphorodithioate is heated under reflux with stirring in 150 milliliters of methyl ethyl ketone for three hours. A second, very viscous liquid phase forms. The solvent is removed under vacuum and the viscous residue extracted with ether, then dissolved in water and the aqueous solution extracted with ether and benzene. Azeotropic removal of the water with benzene leaves 23.2 grams (92 percent by weight of theory) of glassy solid comprising, as identified by nuclear magnetic resonance spectroscopy, product potassium O-methyl S-(N-methylcarbamoyl)methyl phosphorodithioate.

EXAMPLE III

*Dicyclohexylammonium O-ethyl O-(4-nitrophenyl) phosphorothioate*

O,O - diethyl O - (4 - nitrophenyl) phosphorothionate (7.28 grams, 0.025 mole) is added to a refluxing solution of dicyclohexylammonium O,O-diisopropyl phosphorodithioate (9.88 grams, 0.025 mole) in 125 milliliters of methyl ethyl ketone. Refluxing is continued for six hours, after which the solvent is removed under vacuum. The resulting orange liquid residue is poured into 200 milliliters of hexane to give a cream-colored solid which is collected by filtration. This solid is then taken into 200 milliliters of fresh hexane and heated to boiling to dissolve unreacted dicyclohexylammonium diisopropyl phosphorodithioate. The resulting insoluble solid amounts to 6.52 grams (36.7 percent by weight of theory) of product dicyclohexylammonium O-ethyl O-(4-nitrophenyl) phosphorothioate. An analytically pure product which melts at 160° C.–161° C. is recovered after recrystallization from benzene heptane.

EXAMPLE IV

*Cyclohexylammonium O-ethyl O-(4-nitrophenyl) phosphorothioate*

Cyclohexylammonium O,O-diisopropyl phosphorodithioate (62.7 grams, 0.2 mole) is dissolved in methyl ethyl ketone (250 milliliters) and heated to reflux. Then O,O-diethyl O-(4-nitrophenyl) phosphorothionate (58.2 grams, 0.2 mole) is added, and refluxing continued for six hours. Solvent is removed in vacuo and the liquid residue extracted several times with boiling hexane to remove by-products and unreacted starting materials. The insoluble orange oil, on treatment with ether, gives crystalline product cyclohexylammonium O-ethyl O-(4-nitrophenyl) phosphorothioate (36.3 grams, 50 percent by weight of theory), melting point 106° C.–108° C.

EXAMPLE IV(a)

*Triethylammonium O-ethyl O-(4-nitrophenyl) phosphorothioate*

The process of Example IV, above, is repeated in every essential respect with the exception that triethylammonium O,O-diisopropyl phosphorodithioate (0.2 mole) is used in lieu of cyclohexylammonium O,O-diisopropyl phosphorodithioate and the corresponding triethylammonium O-ethyl O-(4-nitrophenyl)phosphorothioate recovered in significant yileds.

EXAMPLE IV(b)

*Dibutylammonium O-ethyl O-(4-nitrophenyl) phosphorothioate*

The process of Example IV, above, is repeated in every essential respect with the exception that dibutylammonium O,O-diisopropyl phosphorodithioate (0.2 mole) is used in lieu of cyclohexylammonium O,O-diisopropyl phosphorodithioate and the corresponding dibutylammonium O-ethyl O-(4-nitrophenyl)phosphorothioate recovered in significant yields.

EXAMPLE IV(c)

*Hexylammonium O-ethyl O-(4-nitrophenyl) phosphorothioate*

The process of Example IV, above, is repeated in every essential respect with the exception that hexylammonium O,O-diisopropyl phosphorodithioate (0.2 mole) is used in lieu of cyclohexylammonium O,O-diisopropyl phosphorodithioate and the corresponding hexylammonium O-ethyl O-(4-nitrophenyl) phosphorothioate recovered in significant yields.

EXAMPLE V

*Potassium O,O-dimethyl phosphorothioate*

Potassium O,O-diisopropyl phosphorodithioate (12.6 grams, 0.05 mole) is dissolved in 100 milliters of methyl ethyl ketone and heated to reflux (81° C.). O,O,O-trimethyl phosphorothionate (7.8 grams, 0.05 mole) is added and the mixture maintained at 81° C. for four hours. Crystals separate when the solution is cooled, giving 5.7 grams of product (73.3 percent by weight of theory) potassium O,O-dimethyl phosphorothioate.

EXAMPLE VI

*Potassium O,S-dimethyl phosphorodithioate*

A solution of O,O,S-trimethyl phosphorodithioate (34.2 grams, 0.2 mole) and potassium O,O-diisopropyl phosphorodithioate (50.4 grams, 0.02 mole) in 400 milliliters of methyl ethyl ketone is heated under reflux for two hours. Solvent is removed in vacuo, and the residue is treated with chloroform to dissolve by-products. The white crystalline produce potassium O,S-dimethyl phosphorodithioate is collected on a filter, 31.1 grams (79.4 percent by weight of theory), melting point 152.5° C.–153.5° C.

EXAMPLE VII

Example VI, above, is repeated in every essential respect with the exception that potassium O,O-diethyl phosphorodithioate is used in lieu of potassium O,O-diisopropyl phosphorodithioate. Similarly, product potassium O,S-dimethyl phosphorodithioate is recovered.

EXAMPLE VIII

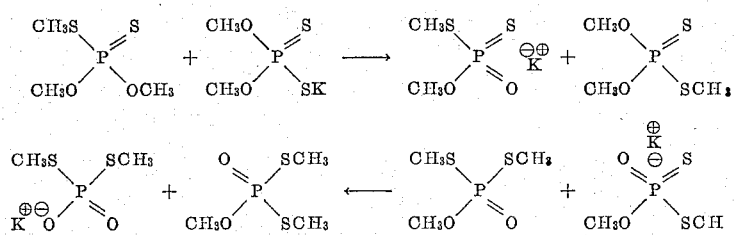

A solution of O,O,S-trimethyl phosphorodithioate (1.72 grams, 0.01 mole) and potassium O,O-dimethyl phosphorodithioate (19.6 grams, 0.1 mole) in 700 milliliters of methyl ethyl ketone is heated under reflux during thirty hours. The solution is then decanted from some inorganic material and cooled to 0° C. The resulting crystals, 8.7 grams, melting point 214° C.–215° C., constitute 44.4 percent by weight of theory of

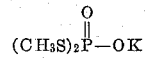

Solvent is evaporated from the filtrate and the residual syrup treated with chloroform until a white powder forms.

This is collected by filtration, 8.3 grams, and constitutes 42.3 percent by weight of theory of

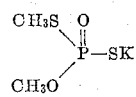

EXAMPLE IX

*Sodium O-benzyl-O-ethyl phosphorothioate*

Equimolar quantities of O-benzyl O,O-diethyl phosphorothionate and sodium O,O-diisopropyl phosphorodithoate are dissolved in methyl ethyl ketone and heated under reflux for two hours. Solvent is removed in vacuo and the residue treated with chloroform. An equal volume of ether is added and the product salt sodium O-benzyl-O-ethyl phosphorothioate is recovered by filtration.

EXAMPLE X

*S-[1,2-bis(ethoxycarbonyl)ethyl] O,S-dimethyl phosphorodithioate*

A solution of 66 grams (0.2 mole) of S-[1,2-bis-(ethoxycarbonyl)ethyl] O,O-dimethyl phosphorodithioate and 50.5 grams (0.2 mole) of potassium diisopropyl phosphorodithioate in 200 milliliters of acetone is heated under reflux for one hour. After evaporation of the solvent under reduced pressure, the residue is extracted with hexane and acetone to remove O,O-diisopropyl S-methyl phosphorodithioate. The clear glassy residue potassium S-[1,2-bis(ethoxycarbonyl)ethyl] O-methyl phosphorodithioate is dissolved in 100 milliliters of water and treated with excess methyl sulfate in two portions. The first portion (25.2 grams, 0.2 mole) is added gradually with cooling, the temperature being kept below 25° C. After a half-hour at room temperature, the product layer is separated and the aqueous layer treated with the same quantity of methyl sulfate as previously, this time at 45° C. The reaction mixture is allowed to cool to room temperature and the two product layers are combined, freed of excess methyl sulfate under vacuum, and dried over sodium sulfate. The isomerized reactant is an oil, shown by nuclear magnetic resonance spectroscopy to contain the P—O—CH$_3$ and P—S—CH$_3$ moieties in equal amounts, and called S-[1,2-bis(ethoxycarbonyl)ethyl] O,S-dimethyl phosphorodithioate. Analytically pure material may be obtained by molecular distillation, $n_D^{25}$ 1.4982.

EXAMPLE XI

*O,S-dimethyl S-(N-methylcarbamoyl)methyl phosphorodithioate*

O,O-dimethyl S-(N-methylcarbamoyl)methyl phosphorodithioate (22.9 grams, 0.1 mole) and potassium diisopropyl phosphorodithioate (25.2 grams, 0.1 mole) are heated in 500 milliliters of water at 75° C. for 1½ hours. The reaction mixture is cooled, the layers separated, and the aqueous phase extracted with three 50-milliliter portions of ether. The ether extracts are combined with the non-aqueous phase, dried and stripped, yielding 19.2 grams (84 percent by weight of theory) of O,O-diisopropyl S-methyl phosphorodithioate. Residual dissolved ether is removed from the aqueous phase under vacuum, and to this aqueous solution of potassium O-methyl S-(N-methylcarbamoyl)methyl phosphorodithioate is added 12.6 grams (0.1 mole) of methyl sulfate and the heterogeneous system stirred rapidly for one hour at 40° C. The cooled reaction mixture is extracted with two 100-milliliter portions of ether, which are discarded, followed by five 100-milliliter portions of chloroform. The chloroform extracts are dried over magnesium sulfate and the solvent removed under vacuum, leaving the product as a viscous straw-colored oil (10.6 grams, 47 percent by weight of theory). Analytically pure material, $n_D^{25}$ 1.5511, is obtained by low-temperature crystallization. The structure is proven by a combination of infrared and nuclear magnetic resonance spectroscopy to be O,S-dimethyl S-(N-methylcarbamoyl)methyl phosphorodithioate.

EXAMPLE XII

*O,S-dimethyl S-(N-methylcarbamoyl)methyl phosphorodithioate*

The compound of Example XI is prepared by the reaction between potassium O,S-dimethyl phosphorodithioate (6.86 grams, 0.035 mole) and 2-chloro-N-methylacetamide (3.76 grams, 0.035 mole) in a heterogeneous system consisting of 5 milliliters of water and 10 milliliters of chloroform. There is isolated from the chloroform layer 55 percent of an oil whose infrared spectrum is virtually identical with that of the compound of Example XI.

EXAMPLES XIII–XVIII

The products of some of the above examples are reacted under the conditions contemplated herein and given hereinabove with equimolar amounts of (R)$_n$Y reactants as shown in the following table to yield their corresponding product esters:

TABLE I

| Example | Reactants | | Product | | |
|---|---|---|---|---|---|
| | Product of Ex. | (R)$_n$Y | R$_1$A$_1$ | A$_2$R$_2$ | R |
| XIII | I | (CH$_3$)$_2$SO$_4$ | CH$_3$O— | —SCH$_2$C(=O)NHCH$_3$ | —CH$_3$ |
| XIV | II | CH$_3$I | CH$_3$O— | —SCH$_2$C(=O)NHCH$_3$ | —CH$_3$ |
| XV | III | (CH$_3$)$_2$SO$_4$ | C$_2$H$_5$O— | —O—⟨C$_6$H$_4$⟩—NO$_2$ | —CH$_3$ |
| XVI | IV | CH$_3$Br | C$_2$H$_5$O— | —O—⟨C$_6$H$_4$⟩—NO$_2$ | —CH$_3$ |
| XVII | V | (C$_2$H$_5$)$_2$SO$_4$ | CH$_3$O— | —OCH$_3$ | —C$_2$H$_5$ |
| XVIII | IX | CH$_3$I | C$_2$H$_5$O— | —OCH$_2$—⟨C$_6$H$_5$⟩ | —CH$_3$ |

EXAMPLES XIX—XXXVII

The following table shows still more in situ preparations which are carried out essentially as in Example X, above, only the reactants being changed as indicated:

TABLE II

| Example | Reactant (A) | | | Reactant (B) | | | | Reactant (R)ₙY | Product (D) | | |
|---|---|---|---|---|---|---|---|---|---|---|---|
| | $R_1A_1$ | $A_2R_2$ | $R_3$ | $R_4A_4$ | $R_5A_5$ | $A_3$ | M | | $R_1A_1$ | $A_2R_2$ | R |
| XIX | $C_2H_5O-$ | $-OCH_3$–⟨phenyl⟩ | $-C_2H_5$ | i-PrO– | i-PrO– | S | Na | $(CH_3)_2SO_4$ | $C_2H_5O-$ | $-OCH_3$–⟨phenyl⟩ | $-CH_3$ |
| XX | ⟨phenyl⟩–O– | –O–⟨phenyl⟩ | $-C_2H_5$ | i-PrO– | i-PrO– | S | K | $C_2H_5I$ | ⟨phenyl⟩–O– | –O–⟨phenyl⟩ | $-C_2H_5$ |
| XXI | $CH_3O-$ | $-SO_2NH_2$–⟨phenyl⟩–O– | $-CH_3$ | i-$C_3H_7O-$ | i-$C_3H_7O-$ | S | $NH_4$ | $C_2H_5Br$ | $CH_3O-$ | $-SO_2NH_2$–⟨phenyl⟩–O– | $-C_2H_5$ |
| XXII | $CH_3O-$ | $-SO_2NH_2$–⟨phenyl⟩–$SCH_2-$ | $-CH_3$ | $C_2H_5O-$ | $C_2H_5O-$ | S | Li | $CH_3I$ | $CH_3O-$ | $-SO_2NH_2$–⟨phenyl⟩–$SCH_2-$ | $-CH_3$ |
| XXIII | $CH_3O-$ | $-CH_3$–⟨phenyl⟩–O– | $-CH_3$ | i-PrO– | i-PrO– | S | Na | $(CH_3)_2SO_4$ | $CH_3O-$ | $-CH_3$–⟨phenyl⟩–O– | $-CH_3$ |
| XXIV | $CH_3O-$ | $-OH$–⟨pyridazinone⟩–O– | $-CH_3$ | i-PrO– | i-PrO– | S | K | $CH_3I$ | $CH_3O-$ | $-OH$–⟨pyridazinone⟩–O– | $-CH_3$ |
| XXV | $CH_3O-$ | $-SCH_2N$–⟨Cl-pyridinone⟩ | $-CH_3$ | i-PrO– | i-PrO– | S | Na | $(CH_3)_2SO_4$ | $CH_3O-$ | $-SCH_2N$–⟨Cl-pyridinone⟩ | $-CH_3$ |
| XXVI | $CH_3O-$ | $-SCH_2CH_2SC_2H_5$ | $-CH_3$ | i-$C_3H_7O-$ | i-$C_3H_7O-$ | S | K | $CH_3Br$ | $CH_3O-$ | $-SCH_2CH_2SC_2H_5$ | $-CH_3$ |
| XXVII | $CH_3O-$ | $-SCH_2SC_2H_5$ | $-CH_3$ | i-PrO– | i-PrO– | S | Li | $(CH_3)_2SO_4$ | $CH_3O-$ | $-SCH_2SC_2H_5$ | $-CH_3$ |
| XXVIII | $CH_3O-$ | –O–⟨2,4-diCl-phenyl⟩ | $-CH_3$ | $C_2H_5O-$ | $C_2H_5O-$ | S | K | $CH_3I$ | $CH_3O-$ | –O–⟨2,4-diCl-phenyl⟩ | $-CH_3$ |
| XXIX | $CH_3O-$ | –O–⟨chromone-Cl⟩ | $-CH_3$ | $C_2H_5O-$ | $C_2H_5O-$ | S | Na | $(CH_3)_2SO_4$ | $CH_3O-$ | –O–⟨chromone-Cl⟩ | $-CH_3$ |

TABLE II—Continued

| Example | Reactant (A) | | | | | Reactant (B) | | | (R)ₙY | R₁A₁ | Product (D) | | R |
|---|---|---|---|---|---|---|---|---|---|---|---|---|---|
| | R₁A₁ | A₂R₂ | R₃ | R₄A₄ | R₅A₅ | A₃ | M | | | | R₁A₁ | A₃R₂ | |
| XXX | CH₃O— |  | —CH₃ | i-PrO— | i-PrO— | S | K | (CH₃)₂SO₄ | CH₃O— |  | —CH₃ | | |
| XXXI | CH₃O— |  | —CH₃ | i-PrO— | i-PrO— | S | K | CH₃I | CH₃O— |  | —CH₃ | | |
| XXXII | CH₃O— |  | —CH₃ | i-C₃H₇O— | i-C₃H₇O— | S | Na | (CH₃)₂SO₄ | CH₃O— |  | —CH₃ | | |
| XXXIII | CH₃O— | —SCH₃ | —CH₃ | C₂H₅O— | C₂H₅O— | S | K | (CH₃)₂SO₄ | CH₃O— | —SCH₃ | —CH₃ | | |
| XXXIV | CH₃O— | —OCH₃ | —CH₃ | C₂H₅O— | C₂H₅O— | S | Li | CH₃Br | CH₃O— | —OCH₃ | —CH₃ | | |
| XXXV | CH₃O— | —OC₂H₅ | —CH₃ | i-PrO— | i-PrO— | S | K | (CH₃)₂SO₄ | CH₃O— | —OC₂H₅ | —CH₃ | | |
| XXXVI | CH₃O— | 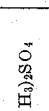 | —CH₃ | i-PrO— | i-PrO— | S | K | (CH₃)₂SO₄ | CH₃O— | 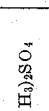 | —CH₃ | | |
| XXXVII | C₂H₅O— |  | —C₂H₅ | i-PrO— | i-PrO— | S | K | (C₂H₅)₂SO₄ | C₂H₅O— |  | —C₂H₅ | | |

Obviously, as indicated hereinabove, the bracketed intermediate products may be recovered and reacted with the $(R)_nY$ reactant to produce the final product.

EXAMPLE XXXVIII

*O,S-dimethyl S-[1,2-bis-(ethoxycarbonyl)ethyl] phosphorodithioate*

The product in Example X, above, may also be prepared by reacting potassium, O,S-dimethyl phosphorodithioate (9.8 grams, 0.05 mole) with diethyl bromosuccinate (12.7 grams, 0.05 mole) in 50 milliliters of refluxing acetonitrile for thirty minutes. Potassium bromide is filtered from the mixture and solvent removed from the filtrate in vacuo. The residue is dissolved in chloroform, washed with 5 percent sodium bicarbonate solution, and finally dried over magnesium sulfate. Solvent again is removed under vacuum, and the product identified above recovered by distillation.

EXAMPLES XXXIX–XLV

The reactant salts in the following table and alkali metal O,S-dimethyl phosphorodithioate

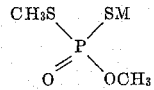

wherein M is as shown in the table, are brought together in equimolar proportions essentially as taught in Example XXXVIII, above, and the corresponding esters produced:

the main organic fraction, and solvent plus unreacted ethyl sulfate are recovered by distillation. The product S-ethyl O-methyl S-[1,2-bis(ethoxycarbonyl)ethyl] phosphorodithioate is obtained as 24 grams of pale amber oil (42 percent by weight of theory) by filtration of the undistilled residue through Hyflo.

EXAMPLE XLVII

*O,S-dimethyl O-(4-nitrophenyl)phosphorothiolate*

Tetramethylammonium O - methyl O - (4-nitrophenyl) phosphorothioate (16.5 grams, 0.05 mole), melting point 174° C., is dissolved in acetonitrile (250 cubic centimeters) by heating to 80° C., and then O,O-dimethyl O-(4-nitrophenyl) phosphorothionate (13.8 grams, 0.05 mole) is added all at once. Reflux is continued six hours. The by-product tetramethylammonium S-methyl O-(4-nitrophenyl) phosphorothiolate is recovered by filtration (14.8 grams, 89.2 percent by weight of theory, melting point 213° C.–214° C.) and solvent evaporated from the filtrate in vacuo. The residue consists of O,S-dimethyl O-(4-nitrophenyl) phosphorothiolate, 11.5 grams (83.3 percent by weight of theory). Analytically pure material, $n_D^{25}$ 1.5616, is obtained by molecular distillation.

EXAMPLE XLVIII

*O,S-diethyl O-(4-nitrophenyl) phosphorothiolate*

Cyclohexylammonium O-ethyl O-(4-nitrophenyl) phosphorothioate (18.1 grams, 0.05 mole) is suspended in water (45 milliliters) and diethyl sulfate (7.7 grams, 0.05

TABLE III

| Example No. | Reactant Salts | Product Ester |||| 
|---|---|---|---|---|---|
| | | M | $R_1A_1$ | $A_2R_2$ | R |
| XXXIX | $ClCH_2SC_2H_5$ | Na | $CH_3S$ | $CH_3O$ | $-CH_2SC_2H_5$ |
| XL | $BrCH_2CH_2SC_2H_5$ | K | $CH_3S$ | $CH_3O$ | $-CH_2CH_2SC_2H_5$ |
| XLI | $ClCH_2-\langle\text{phenyl}\rangle$ | Na | $CH_3S$ | $CH_3O$ | $-CH_2-\langle\text{phenyl}\rangle$ |
| XLII | $ClCH_2-\langle\text{phenyl}\rangle-SO_2NH_2$ | Li | $CH_3S$ | $CH_3O$ | $-CH_2-\langle\text{phenyl}\rangle-SO_2NH_2$ |
| XLIII | $ClCH_2N\langle\text{pyridinone-Cl}\rangle$ | K | $CH_3S$ | $CH_3O$ | $-CH_2N\langle\text{pyridinone-Cl}\rangle$ |
| XLIV | $ClCH_2N\langle\text{benzotriazinone}\rangle$ | Li | $CH_3S$ | $CH_3O$ | $-CH_2N\langle\text{benzotriazinone}\rangle$ |
| XLV | $ClCH_2-\langle\text{phenyl}\rangle-NO_2$ | K | $CH_3S$ | $CH_3O$ | $-CH_2-\langle\text{phenyl}\rangle-NO_2$ |

EXAMPLE XLVI

*O-methyl S-ethyl S[1,2-bis(ethoxycarbonyl)ethyl] phosphorodithioate*

To an aqueous solution of potassium O-methyl S-[1,2-bis(ethoxycarbonyl)ethyl] phosphorodithioate, calculated to contain 0.167 mole in 153 milliliters solution, is added dropwise 44 milliliters (0.334 mole) of ethyl sulfate. The mixture is heated to 50° C. and allowed to cool slowly. The lower organic layer is removed, and the aqueous layer extracted well with ether. The ether extracts are added to mole) is added dropwise. The resulting emulsion is heated at 65° C–75° C. for one hour, and then allowed to separate. The upper aqueous layer is extracted twice with chloroform and the extracts added to the main organic layer. This solution is washed with dilute sulfuric acid and then with water, after which it is dried over magnesium sulfate. Solvent is removed under vacuum, and the liquid residue of O,S-diethyl O-(4-nitrophenyl) phosphorothiolate weighs 11.5 grams (79.1 percent by weight of theory), $n_D^{25}$ 1.5492. Analytically pure material is obtained by molecular distillation.

The results given in the following tables are indicative of the biological activity of the compounds of the present invention:

TABLE IV

| | Compound | Aphids, .01% | Mites, 0.1% | Milkweed Bug, 1% Dust | German Roach, 1% Dust |
|---|---|---|---|---|---|
| 1 | CH₃S\P(=O)(OCH₃)—S—CH(COOC₂H₅)—CH₂—COOC₂H₅ | 98 | 100 | 100 | 100 |
| 2 | CH₃S\P(=O)(OCH₃)—SCH₂C(=O)NHCH₃ | 100 | 100 | 80 | |

TABLE V

| | Compound | Aphids, 0.01% | Tribolium confusum, 1% | Milkweed Bug, 1% | German Roach, 1% | Mites, 0.1% |
|---|---|---|---|---|---|---|
| 1 | C₂H₅S\P(=O)(OC₂H₅)—O—C₆H₄—NO₂ | 95 | 100 | 100 | 100 | 100 |
| 2 | CH₃S\P(=O)(OCH₃)—O—C₆H₄—NO₂ | 100 | 100 | 100 | 100 | 100 |
| 3 | C₂H₅S\P(=O)(OCH₃)—SCH(COOC₂H₅)—CH₂COOC₂H₅ | 100 | 72 | 95 | 20 | 100 |

The tests yielding the biological data in Tables IV and V, above, are as follows:

Nasturtium Aphid (*Aphis rumicus* L.).—The compounds to be tested are made up as 0.1% solutions in 65% acetone-35% water. Pots containing nasturtium plants two inches tall and infested two days before are selected for testing. The pots are sprayed similarly for each test. Mortality estimates are made after holding for two days at 70° F., 50% R.H. and compounds showing kills greater than 75% are further tested at tenfold dilutions in 65% acetone-35% water.

Confused Flour Beetle (*Tribolium confusum* Duv.).— Compounds to be tested are made up as 1.0% dusts by mixing with talc. This dust is then brought into contact (similarly for each test) with confused flour beetles for three days at 80° F., 60% R.H., following which mortality counts are made.

Large Milkweed Bug (*Oncopeltus fasciatus* Dall.).— The 1% dusts described just above are used in this test and the bugs contacted therewith (similarly for each test). A small amount of moisture is also provided. Mortality counts are made after holding for three days at 80° F., 60% R.H.

German Cockroach (*Blattella germanica* L.).—The procedure is the same as for the large Milkweed Bug; however, only adult males are used in this test.

Two-spotted Spider Mite (*Tetranychus telarius* L.).— Compounds to be tested are made up as 0.1% solutions in 65% acetone-35% water. Sieva lima bean plants are infested with mites about five hours before testing. The infested leaves are dipped in the test solutions and the plants allowed to dry. The treated plants are held for two days at 80° F., 60% R.H., and the mite mortality calculated. Compounds showing kills greater than 85% are further tested at ten-fold dilutions in 65% acetone-35% water.

While the above tables illustrate insecticidal and miticidal activities of typical esters provided by the present invention, it will be appreciated that the product esters contemplated herein manifest varying degrees of activity with respect to mites and particular insects. This can be observed to a certain degree from the above tables (see especially Compound 3 of Table V).

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

What is claimed is:

1. An organophosphorothioate ester of the formula

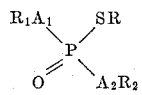

wherein $A_1$ and $A_2$ represent a member selected from the group consisting of oxygen and sulfur; $R_1$ represents a member selected from the group consisting of lower alkyl and phenyl; R represents a member selected from the group consisting of lower alkyl

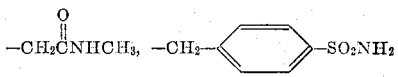

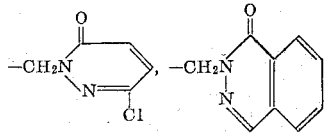

$R_2$ represents a member selected from the group consisting of

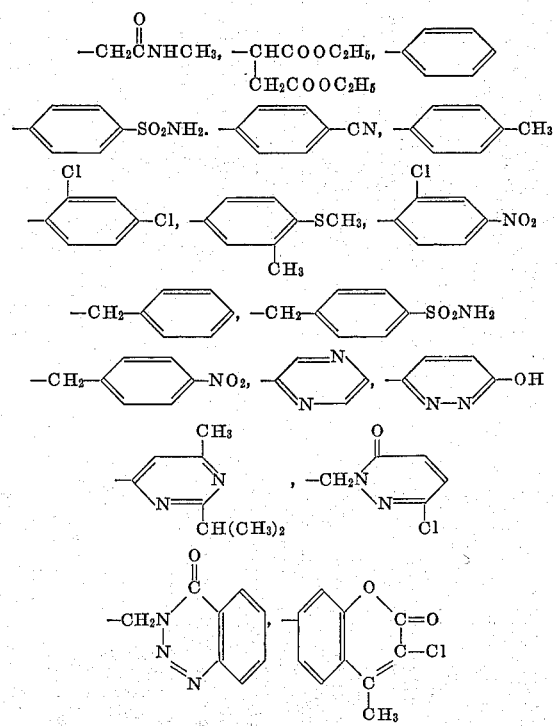

however, when $A_2R_2$ is a member selected from the group consisting of lower alkoxy,

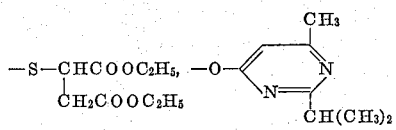

and

R is a member of the group above given other than lower alkyl, and when R is lower alkyl and $R_2$ is a member selected from the group consisting of

and

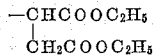

$A_2$ is S.

2. An organophosphoric acid salt of the formula

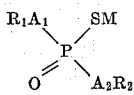

wherein $A_1$ and $A_2$ each represent a member selected from the group consisting of oxygen and sulfur; $R_1$ represents lower alkyl; $R_2$ represents a member selected from the group consisting of

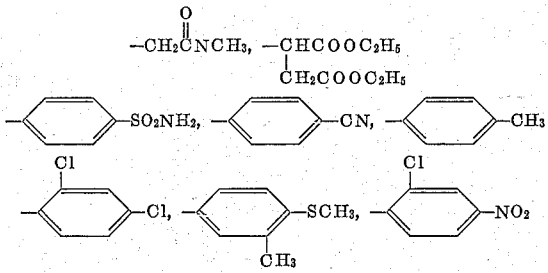

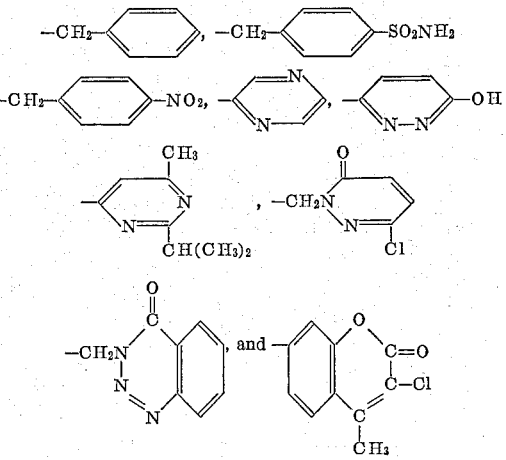

M represents an ion selected from the group consisting of alkali metal ions, ammonium ions, monoalkyl ($C_1$–$C_6$) ammonium ions; dialkyl ($C_1$–$C_6$) ammonium ions, trialkyl ($C_1$–$C_6$) ammonium ions, cyclohexylammonium ions and dicyclohexylammonium ions; however, when M is alkali metal, $R_2$ is other than a member selected from the group consisting of phenyl, benzyl and para-nitrophenyl.

3. The cyclohexylammonium salt of O-ethyl O-(4-nitrophenyl) phosphorothioate.
4. The triethylammonium salt of O-ethyl O-(4-nitrophenyl) phosphorothioate.
5. The dibutylammonium salt of O-ethyl O-(4-nitrophenyl) phosphorothioate.
6. The hexylammonium salt of O-ethyl O-(4-nitrophenyl) phosphorothioate.
7. The alkali metal salt of S-[1,2-bis(ethoxycarbonyl)-ethyl] O-methyl phosphorodithioate.
8. The alkali metal salt of O-methyl S-(N-methylcarbamoyl)methyl phosphorodithioate.
9. A method of preparing organophosphorothioate compounds which comprises bringing together in reactive contact in the presence of an inert solvent a thiophosphate ester of the formula (A) 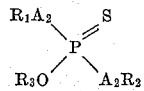

with an organophosphoric acid salt of the formula (B) 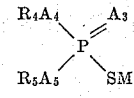

and recovering the corresponding salt of the formula (C) 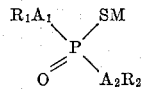

the symbols in the above formulae having the following meanings:

$A_1$, $A_2$, $A_3$, $A_4$ and $A_5$ each represent a member selected from the group consisting of oxygen and sulfur;
$R_1$ represents a member selected from the group consisting of lower alkyl and phenyl;
$R_3$ and $R_5$ each represent lower alkyl;
$R_2$ and $R_4$ each represent a member selected from the group consisting of lower alkyl

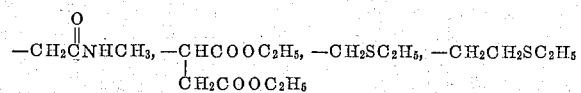

19

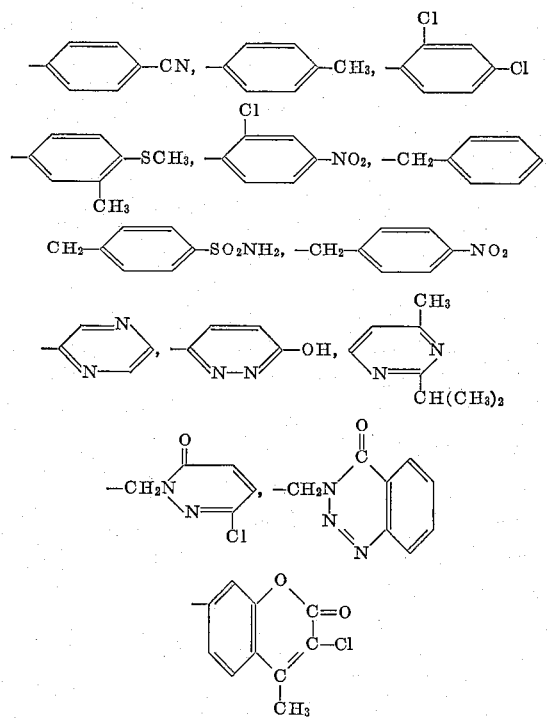

M represents an ion selected from the group consisting of alkali metal ions, ammonium ions, monoalkyl ($C_1$-$C_6$) ammonium ions, dialkyl ($C_1$-$C_6$) ammonium ions, trialkyl ($C_1$-$C_6$) ammonium ions, cyclohexylammonium ions and dicyclohexylammonium ions.

10. The process of claim 9 wherein the salts (C) are reacted with a compound having the formula $(R)_nY$, wherein R represents a member selected from the group consisting of lower alkyl,

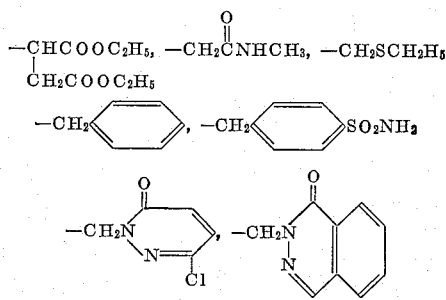

and

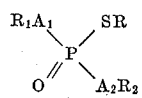

Y is a member selected from the group consisting of halogen and —$SO_4$, and $n$ is a value from 1 through 2, and recovering the corresponding ester conforming to the formula

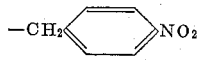

wherein R, $R_1$, $R_2$, $A_1$ and $A_2$ have the meanings given in claim 1 and above in the instant claim.

11. A method according to claim 9 in which reactant (A) is O,O,S-trimethyl phosphorodithioate, and the salt (C) recovered is the alkali metal salt of O,S-dimethyl phosphorodithioate.

12. A method according to claim 9 in which the reactant (A) is O,O-diethyl O-(4-nitrophenyl) phosphorothionate and the salt (C) recovered is the alkali metal salt of O-ethyl O-(4-nitrophenyl) phosphorothioate.

20

13. A method according to claim 9 in which the reactant (A) is O-benzyl O,O-diethyl phosphorothionate and the salt (C) recovered is the alkali metal salt of O-benzyl-O-ethyl phosphorothioate.

14. A method according to claim 9 in which the reactant (A) is S-[1,2-bis(ethoxycarbonyl)ethyl] O,O-dimethyl phosphorodithioate and the salt (C) recovered is the alkali metal salt of S-[1,2-bis(ethoxycarbonyl)ethyl] O-methyl phosphorodithioate.

15. A method according to claim 9 in which the reactant (A) is O,O-dimethyl S-(N-methylcarbamoyl)methyl phosphorodithioate and the salt (C) recovered in the alkali metal salt of O-methyl S-(N-methylcarbamoyl)-methyl phosphorodithioate.

16. A method of preparing organophosphorothioate compounds which comprises bringing together in reactive contact in the presence of an inert solvent a thiophosphate ester of the formula (A) $$\begin{array}{c} R_1A_1 \\ \diagdown \\ P \\ \diagup \quad \diagdown \\ R_3O \quad\quad A_2R_2 \end{array} \!\!\! S$$

with an organophosphoric acid salt of the formula (B) $$\begin{array}{c} R_4A_4 \\ \diagdown \\ P \\ \diagup \quad \diagdown \\ R_5A_5 \quad\quad SM \end{array} \!\!\! A_3$$

and an organic salt conforming to the formula $$(R)_nY$$

and recovering the corresponding ester (D) $$\begin{array}{c} R_1A_1 \\ \diagdown \\ P \\ \diagup \quad \diagdown \\ O \quad\quad A_2R_2 \end{array} \!\!\! SR$$

the symbols in the above formulae having the following meanings: $A_1$, $A_2$, $A_3$, $A_4$ and $A_5$ each represent a member selected from the group consisting of oxygen and sulfur; $R_1$ represents a member selected from the group consisting of lower alkyl and phenyl; $R_3$ and $R_5$ each represent lower alkyl; $R_2$ and $R_4$ each represent a member selected from the group consisting of lower alkyl M represents an ion selected from the group consisting of alkali metal ions, ammonium ions, monoalkyl ($C_1$–$C_6$) ammonium ions, dialkyl ($C_1$–$C_6$) ammonium ions, trialkyl ($C_1$–$C_6$) ammonium ions, cyclohexylammonium ions and dicyclohexylammonium ions; R represents lower alkyl

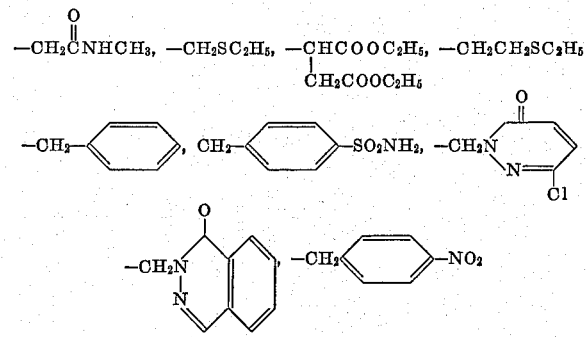

Y represents a member selected from the group consisting of halogen and —$SO_4$; and $n$ is a value from 1 through 2.

References Cited by the Examiner

UNITED STATES PATENTS 3,092,649  6/1963  Schrader _____ 260—943

OTHER REFERENCES

Kosolapoff: "Organo - Phosphorus Compounds" (1950), John Wiley & Sons, Inc., p. 256.

CHARLES B. PARKER, *Primary Examiner.*

FRANK M. SIKORA, RICHARD L. RAYMOND, *Assistant Examiners.*